United States Patent
Cooke

(10) Patent No.: US 8,388,323 B2
(45) Date of Patent: Mar. 5, 2013

(54) REAGENT DOSING PUMP

(75) Inventor: Michael P. Cooke, Gillingham (GB)

(73) Assignee: Delphi Technologies Holding S.arl, Troy, MI (US)

( * ) Notice: Subject to any disclaimer, the term of this patent is extended or adjusted under 35 U.S.C. 154(b) by 1120 days.

(21) Appl. No.: 11/827,420

(22) Filed: Jul. 11, 2007

(65) Prior Publication Data

US 2008/0014103 A1    Jan. 17, 2008

(30) Foreign Application Priority Data

Jul. 12, 2006   (EP) ..................... 06253638

(51) Int. Cl.
*F04B 17/04* (2006.01)
*F04B 35/04* (2006.01)
(52) U.S. Cl. ........................ 417/417; 417/366
(58) Field of Classification Search .............. 417/366, 417/417, 371; 60/286, 287
See application file for complete search history.

(56) References Cited

U.S. PATENT DOCUMENTS

| 3,601,509 A * | 8/1971 | Kreitchman | 417/417 |
| 4,272,225 A * | 6/1981 | Fujinaka et al. | 417/417 |
| 4,934,907 A * | 6/1990 | Kroner | 417/417 |
| 5,509,792 A * | 4/1996 | Sullivan et al. | 417/417 |
| 2004/0093856 A1 | 5/2004 | Dingle et al. | |
| 2004/0179960 A1* | 9/2004 | Lenke | 417/415 |

FOREIGN PATENT DOCUMENTS

| DE | 200 19 406 | 1/2001 |
| EP | 1555433 | 7/2005 |
| FR | 2343139 | 9/1977 |
| GB | 1187713 | 4/1970 |
| JP | 5-21180 | 3/1993 |
| JP | 6-510583 | 11/1994 |
| JP | 2003-328735 | 11/2003 |
| JP | 2006-2663 | 1/2006 |

OTHER PUBLICATIONS

Japan Office Action dated Apr. 5, 2010.
European Search Report dated Sep. 28, 2010.

* cited by examiner

*Primary Examiner* — Peter J Bertheaud
(74) *Attorney, Agent, or Firm* — Thomas N. Twomey

(57) ABSTRACT

A pump is provided for pumping a liquid. The pump includes an inlet, an outlet, and a pumping chamber for receiving the liquid from the inlet. An actuator arrangement is also included and is operable between a first position and a second position to pump the liquid from the pumping chamber into the outlet and includes a solenoid actuator having a solenoid coil, a pole element, and a coil former to carry the solenoid coil. The inlet and the pumping chamber are in fluid communication with a supply passage when the actuator arrangement is in the first position. The supply passage extends into or around the solenoid coil and is defined between the coil former and the pole element to allow transfer of heat from the actuator arrangement.

19 Claims, 6 Drawing Sheets

REAGENT DOSING PUMP

TECHNICAL FIELD OF INVENTION

This invention relates to a device for use in a system for dosing exhaust gases with reagent, for example to reduce emissions of harmful substances to the atmosphere. In particular, the invention relates to a pump for dispensing reagent.

BACKGROUND OF INVENTION

It is well known that exhaust gases from internal combustion engines contain substances which are harmful to the environment and which can pose a threat to public health. For many years, a sustained effort has been made within the automotive industry to reduce the release to the atmosphere of harmful substances carried in exhaust gases, both by modifying the combustion process itself to give a reduced yield of harmful combustion products, and by treating the exhaust gases before their emission into the atmosphere, for example by providing a catalyst to induce chemical breakdown of the harmful constituents into benign compounds.

One class of harmful exhaust gas constituents comprises the oxides of nitrogen, with the generic chemical formula $NO_x$, where x typically ranges from 0.5 to 2.5. Nitrogen oxides contribute to the formation of ground-level ozone, nitrate particles and nitrogen dioxide, all of which can cause respiratory problems. Furthermore, nitrogen oxides can lead to the formation of acid rain, and nitrous oxide ($N_2O$) in particular is a greenhouse gas and contributes to the destruction of the ozone layer. It is therefore desirable to reduce the emission of nitrogen oxides into the atmosphere, and furthermore, new vehicles must comply with increasingly stringent limits on the acceptable levels of $NO_x$ emissions.

In certain circumstances, $NO_x$ emissions can be reduced by conventional exhaust gas catalysis, for example in a three-way catalyst comprising immobilised powders of platinum, palladium and rhodium. However, in diesel or lean-burn petrol combustion engines, a high concentration of oxygen is present in the exhaust gas, and this oxygen inhibits the catalysed breakdown of the nitrogen oxides in conventional systems. Consequently, a need has arisen for an alternative strategy to limit $NO_x$ emissions.

One strategy, known as selective catalytic reduction or SCR, involves the introduction of a reagent comprising a reducing agent, typically a liquid ammonia source such as an aqueous urea solution, into the exhaust gas stream. The reducing agent is injected into the exhaust gas upstream of an exhaust gas catalyst, known as an SCR catalyst, typically comprising a mixture of catalyst powders such as titanium oxide, vanadium oxide and tungsten oxide immobilised on a ceramic honeycomb structure. Nitrogen oxides in the exhaust gas undergo a catalysed reduction reaction with the ammonia source on the SCR catalyst, forming gaseous nitrogen and water. An example of such a system is described in International Patent Application No. WO 2004/111401 A.

Although aqueous urea is a convenient and cost-effective source of ammonia for SCR systems, the maximum temperature at which it can be used is somewhat limited. Urea crystals tend to precipitate when the temperature of the solution is greater than approximately 70° C. Precipitation is undesirable because the precipitates can cause blockages in the delivery system, for example in the small-diameter outlets typically provided in an atomising nozzle. In addition, the formation of precipitates alters the concentration of the remaining solution, so that the effective quantity of ammonia delivered to the exhaust flow becomes uncertain. This could lead to inefficient catalysis and an insufficient reduction in $NO_x$ emissions.

If aqueous urea is to be used effectively as a reagent in SCR, the system provided for dosing the exhaust gases with reagent should ideally be arranged to ensure that the temperature of the urea solution does not exceed the temperature at which precipitation occurs. However, the reagent must be discharged into the stream of hot exhaust gases, which are typically at a temperature of around 400° C. at the point where the reagent enters the exhaust gas stream. The reagent will therefore almost inevitably reach a temperature in excess of that at which solid precipitates begin to form.

In the Applicant's United States Patent Application No. US2004/0093856, a solenoid-operated reagent dosing pump is described. Because this pump can generate high reagent pressures, it is able to blow precipitates through an outlet nozzle. In this way, any solid particles that form due to overheating of the reagent can be forced out of the dosing system and into the exhaust gas stream and are prevented from blocking the flow of reagent. Furthermore, the use of a high-pressure solenoid pump allows the delivery of small quantities of reagent at high frequencies, with the result that the mixture of exhaust gas and reagent flowing on to the SCR catalyst has a more uniform temperature and composition in comparison to other systems, in which larger quantities of reagent are delivered at lower frequencies. This improves the efficiency of the reduction reactions occurring at the catalyst, because the temperature and gas composition can be better maintained at their optimum levels for reaction.

Although use of a solenoid pump offers significant advantages for reagent dosing devices, one potential drawback arises from the sensitivity of the solenoid to temperature. The efficiency of the solenoid, often expressed as the ratio of the mechanical power output to the electrical power input, decreases as the temperature of the solenoid increases. This decrease in efficiency is due in part to the increase in resistance of the coil with temperature. When used in a reagent dosing system, the solenoid tends to heat up due to the proximity of the pump to the hot exhaust system, and due to the resistive heating of the coil. The temperature in the vicinity of the solenoid is also relatively high, which that dissipation of heat from the solenoid into its surroundings is limited.

Against this background, it would be desirable to provide a reagent dosing device for use in an exhaust gas dosing system which overcomes or alleviates the abovementioned problems.

SUMMARY OF THE INVENTION

According to a first aspect of the present invention, there is provided a reagent dosing device comprising a pump for pumping a liquid, the pump comprising an inlet, an outlet, a pumping chamber for receiving the liquid from the inlet, and an actuator arrangement operable between a first position and a second position and arranged to pump the liquid from the pumping chamber into the outlet, wherein the inlet and the pumping chamber are in fluid communication with a supply passage when the actuator arrangement is in the first position, and the supply passage extends into or around the actuator arrangement so as to allow transfer of heat from the actuator arrangement to the liquid.

Because heat is transferred from the actuator arrangement to the liquid on passage of the liquid through the pump, heat is carried away from the actuator arrangement and hence from the pump when the heated reagent is dispensed from the pump by way of the outlet. In this way, the liquid acts to cool the actuator arrangement of the pump, thereby allowing the actuator arrangement to operate at an improved efficiency when compared to a pump in which no significant cooling occurs.

The actuator arrangement may be disposed substantially between the inlet and the outlet so that the liquid can pass conveniently into or around the actuator arrangement.

The pump may further comprise a delivery valve operable between a closed position and an open position and arranged to restrict the flow of liquid from the pumping chamber to the outlet when the delivery valve is in the closed position. The provision of a delivery valve allows the pressure of liquid in the pumping chamber to build up before the liquid is passed into the outlet, so that a high pressure of the liquid is obtained in the outlet. The delivery valve may be arranged so that the flow of liquid from the pumping chamber to the outlet substantially ceases when the delivery valve is in the closed position. Alternatively, the delivery valve may be arranged so that, when the delivery valve is in the closed position, the flow of liquid from the pumping chamber to the outlet can occur at a reduced rate relative to when the delivery valve is in an open position.

A fluid communication path may be provided between the pumping chamber and the supply passage by one or more filling ports. For example, filling ports may be provided in the actuator arrangement. In one arrangement, the fluid communication path is blocked by the actuator arrangement when the actuator arrangement is in the second position.

Conveniently, the actuator arrangement comprises a plunger arranged to move in response to switching of the actuator arrangement between the first position and the second position. The plunger may be arranged to cause a change in volume of the pumping chamber when the actuator arrangement is switched between the first position and the second position. For example, when the actuator arrangement is switched from the first position to the second position, the plunger may cause a decrease in the volume of the pumping chamber, and hence an increase in the liquid pressure within the pumping chamber so as to cause pumping of the liquid from the pumping chamber.

The actuator arrangement may further comprise a stopper carried on the plunger. The position of the stopper with respect to the plunger may be arranged to be adjustable so as to influence the change in volume of the pumping chamber that occurs when the actuator arrangement is switched between the first position and the second position. Hence, the volume of liquid pumped from the pumping chamber when the actuator arrangement is switched from the first position to the second position can be adjusted, for example during manufacture of the device.

Similarly, the pump may further comprise a lift stop, and the stopper may be arranged to abut the lift stop when the actuator arrangement is in the first position. The position of the lift stop with respect to the actuator arrangement may be arranged to be adjustable so as to influence the distance through which the plunger moves when the actuator arrangement is switched between the first position and the second position. In this way, the acceleration of the plunger can be controlled to influence the change in pressure with time of the liquid leaving the pump by the outlet, for example during manufacture of the device.

The actuator arrangement comprises a solenoid actuator comprising a solenoid coil, and the supply passage extends into or around the solenoid coil. In one such arrangement, the solenoid coil defines an axis and the direction of flow of liquid in the supply passage is substantially parallel to the axis. The pump may further comprise a pole element and a coil former to carry the solenoid coil, and the coil former may be disposed around at least a part of the pole element so that the supply passage may be defined partly by a surface of the pole element and partly by a surface of the coil former.

When a solenoid actuator is employed along with a plunger carrying a stopper, the stopper can conveniently be an armature of the solenoid actuator.

Because the actuator arrangement is cooled by transfer of heat from the actuator arrangement to the liquid, in use, a solenoid actuator deployed in the present invention will remain at a lower temperature than if significant transfer of heat from the actuator to the liquid did not occur. As a consequence, the efficiency of the solenoid actuator is optimised.

Although a solenoid actuator is particularly suitable for use in the present application, an alternative actuator arrangement such as a piezoelectric or hydraulic actuator could be employed in the present invention. Again, the cooling effected by the transfer of heat from the actuator arrangement to the liquid serves to improve the efficiency of the actuator arrangement, when compared to a pump in which significant cooling of the actuator does not occur.

The present invention also contemplates in a second aspect a method of cooling a pump for dispensing a liquid in a gas flow, the pump comprising an inlet, a pumping chamber and an actuator arrangement; the method comprising supplying the liquid to the inlet; transferring the liquid to the pumping chamber by passing the liquid into or around the actuator arrangement; and pumping the liquid from the pumping chamber to the outlet so as to carry heat away from the actuator arrangement.

The pump of the present invention is ideally suited to applications in which the liquid is a reagent for selective catalytic reduction (SCR). The invention therefore extends to a dosing device comprising a pump in accordance with any of the above described pumps. The dosing device may, for example, further comprise a dispensing for dispensing the liquid into a gas flow. A connector to provide a fluid communication path between the outlet of the pump and the dispensing may also be provided in the dosing device. The dispensing may comprise a dispenser having a nozzle and a nozzle valve to control the flow of liquid through the dispenser. Furthermore, the invention also extends to an exhaust system comprising a dosing device as previously described.

The liquid for selective catalytic reduction may be an aqueous solution of urea. The lower temperature limit for use of the urea solution is relatively modest. For example, at a typical concentration (32%), the urea solution freezes at −11.5 C, which is well above the minimum ambient temperature that might routinely be expected in many countries. Of course, the solution cannot be pumped or sprayed when it is frozen.

The actuator arrangement may be arranged so that, in use, the temperature of the actuator arrangement increases upon energisation of the actuator arrangement so as to heat the supply passage. In this way, should liquid freeze within the pump, heat is supplied to the frozen liquid in the supply passage to melt the frozen liquid, therefore allowing the pump to operate. To this end, according to a third aspect of the invention, there is provided a method of melting frozen liquid in a pump as previously described, the method comprising energising the actuator arrangement so as to cause heating of the actuator arrangement and melting of the frozen liquid.

Freezing of liquid often causes a volume increase. For example, the volume of a typical urea solution increases by approximately 10% on freezing. So as to avoid the development of significant stresses within the pump should the liquid freeze, the supply passage may have a relatively narrow cross-section in at least one dimension. For example, the supply passage may be an annular chamber with a thin radial dimension so as to avoid the development of significant radial stresses.

According to a fourth aspect of the invention, there is provided a pump suitable for dispensing a liquid into an exhaust gas flow of an internal combustion engine, the pump comprising an inlet, an outlet and an actuator arrangement, wherein the inlet, the outlet and the actuator arrangement are arranged substantially along a common axis so that, in use, liquid passes through the pump and the actuator arrangement substantially in a direction parallel to the common axis.

The pump according to the fourth aspect of the invention is advantageous because the liquid passes along a largely straight, non-tortuous path. For example, this allows the liquid to pass through the pump with little or no impediment due to turbulent flow at corners or kinks in the flow path of the liquid. Energy need not be expended in overcoming such impediment, therefore the efficiency of the pump in this respect is maximised. Furthermore, the pump is of a compact design and is suitable for mounting directly in the flow path of liquid from a source of liquid to a dispenser such as a nozzle. The pump is also convenient to manufacture. For instance, many of the components of the pump could be circular in cross-section and could be fabricated by machining on a lathe, with little additional machining required to create the final components. Such a fabrication process offers a low-cost manufacturing route which can be readily automated.

BRIEF DESCRIPTION OF DRAWINGS

Embodiments of the present invention will now be described, by way of example only, with reference to the accompanying drawings, in which.

DETAILED DESCRIPTION OF INVENTION

In this specification, the terms 'downstream' and 'upstream' refer to the direction of reagent flow through the device during dispensing of the reagent into the gas flow during normal use. For example, 'downstream' is leftwards in FIG. 2 and rightwards in FIG. 3.

Figure 1:
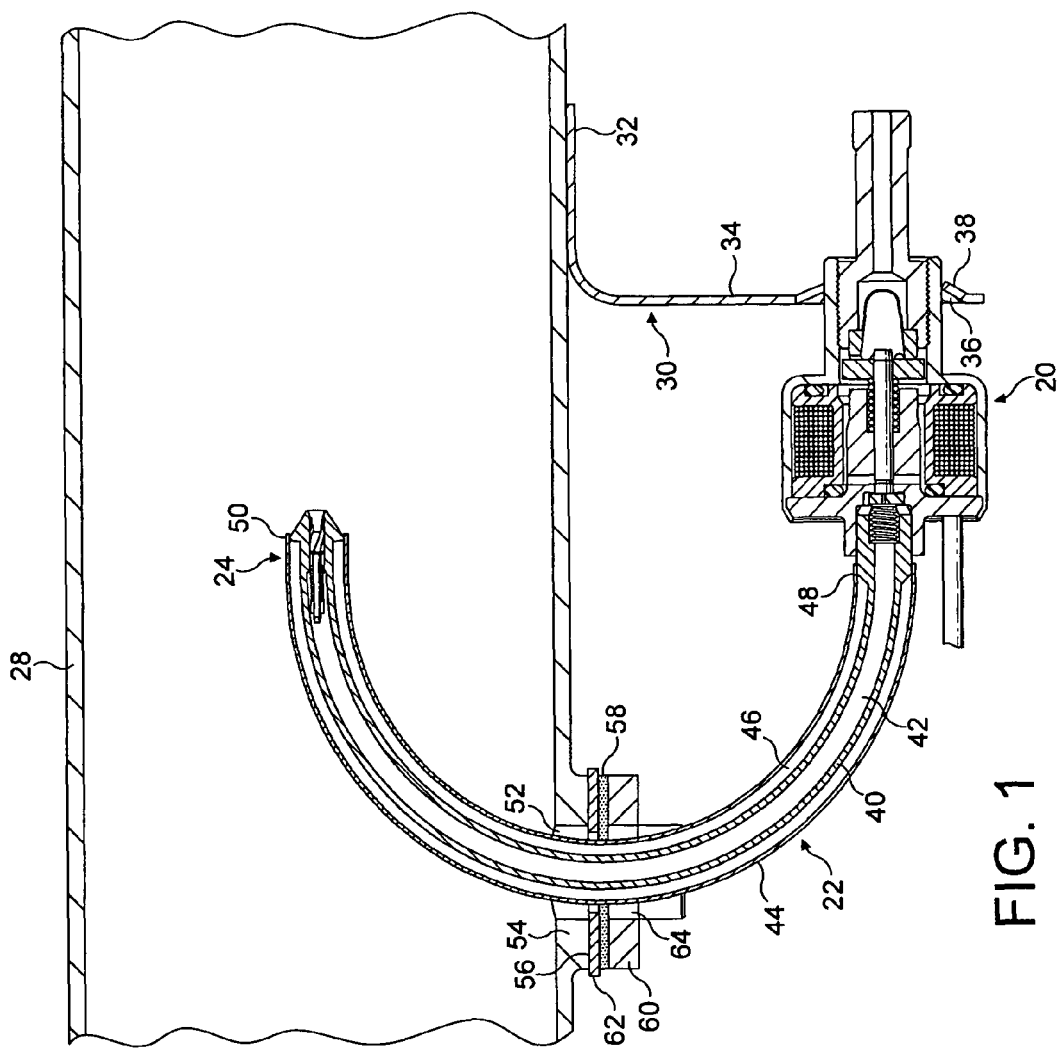
FIG. 1 is a cross-sectional view of a dosing device according to the present invention, mounted in an exhaust pipe.

Referring to FIG. 1, a dosing device comprises a pump 20, a connecting pipe 22, and a dispenser 24. The connecting pipe 22 is generally semicircular and is connected at a first end to the pump 20 by way of a pump connector 26. The dispenser 24 is located at a second end of the connecting pipe 22. In use, the device is mounted to an exhaust pipe 28 of an internal combustion engine (not shown). The dispenser 24 is disposed within a flow of exhaust gases within the exhaust pipe 28, while the pump 20 is disposed outside the exhaust pipe 28.

A mounting bracket 30 is provided to attach the pump 20 to the exhaust pipe 28. The mounting bracket 30 comprises an 'L'-shaped plate having a first portion 32 (horizontal in FIG. 1) and a second portion 34 (vertical in FIG. 1) perpendicular to the first portion 32. The first portion 32 of the mounting bracket 30 is attached to the exhaust pipe 28, for example by a welded joint. The second portion 34 of the mounting bracket 30 contains an aperture 36 and spring clips 38 disposed around the aperture, for example in the form of a star washer. The pump 20 is accommodated within the aperture 36 and is retained in the mounting bracket 30 by the spring clips 38.

The connecting pipe 22 comprises a tube 40 having a bore 42 through which reagent can pass. The tube 40 is capable of accommodating reagent at high pressure. The tube 40 is received within a jacket 44 for the connecting pipe 22 which defines a compartment 46 between the tube 40 and the jacket 44. The jacket 44 is sealed to the tube 40 at a first seal 48 at the outlet or pump connector 26 and at a second seal 50 at the dispenser 24 so that the compartment 46 defines an enclosed volume. The compartment 46 is evacuated to limit the transfer of heat from the hot exhaust gases within the exhaust pipe 28 to the reagent in the bore 42 of the tube 40, in use, so as to prevent overheating of the reagent.

The connecting pipe 22 passes through a port 52 in a wall of the exhaust pipe 28. The port 52 is cylindrical, and has a surrounding collar 54 on the external surface of the exhaust pipe 28. The collar 54 is shaped to define a planar mounting face 56. An annular flange 58 is carried on the jacket 44 of the connecting pipe 22. The flange 58 is pressed towards the mounting face 56 by a clamping ring 60, and a sealing washer 62 is clamped between the flange 58 and the mounting face 56 to form a gas-tight seal. Threaded studs (not shown) are carried on the collar 54 and pass through complementary holes (not shown) in the sealing washer 62, flange 58 and clamping ring 60. The clamping ring 60 is held on the exhaust pipe 28 by way of internally-threaded nuts 64 screwed onto the studs.

Figure 2:
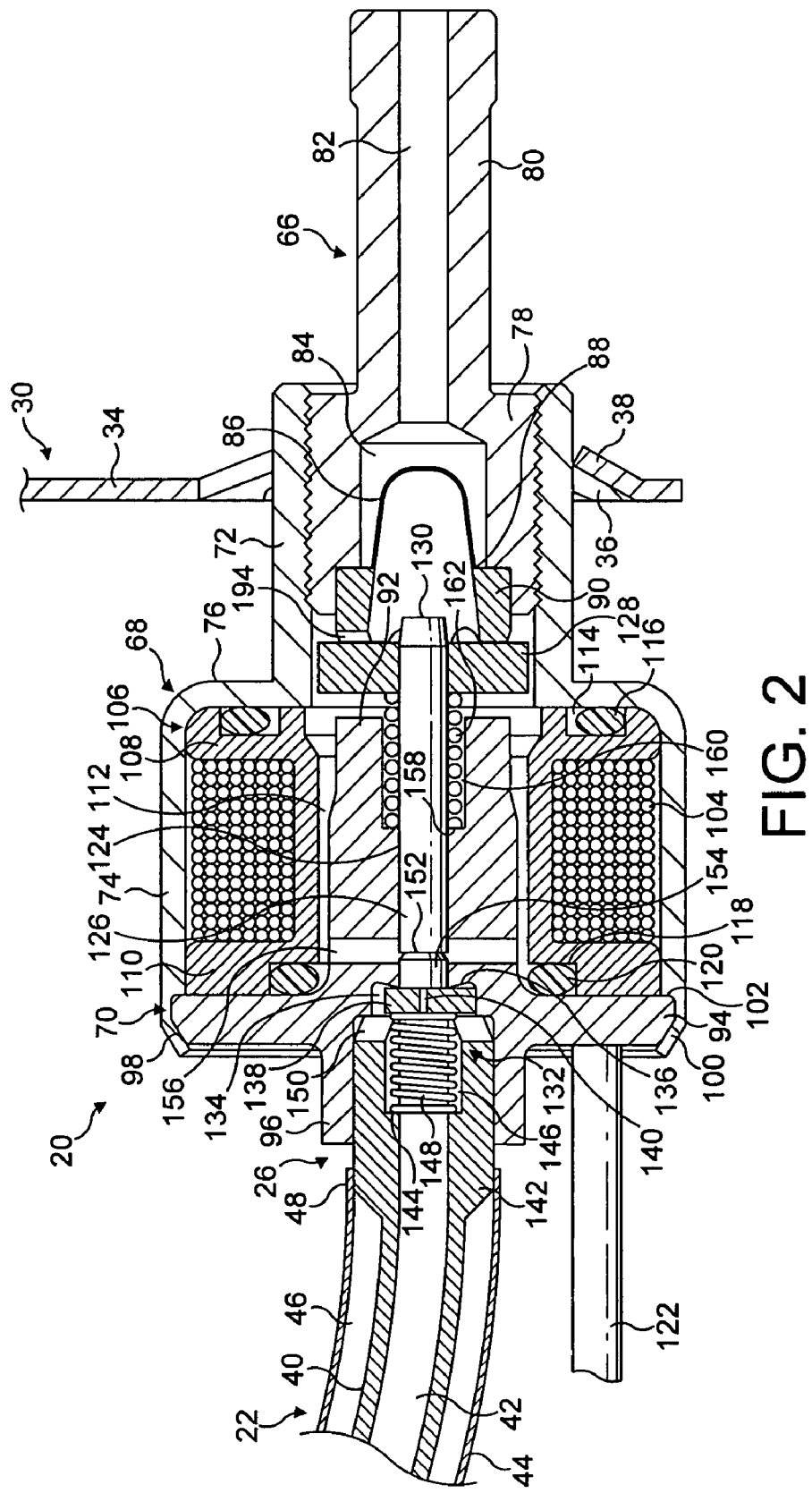
FIG. 2 is a cross-sectional view at larger scale of the pump of the dosing device of FIG. 1.

Referring to FIG. 2, the pump 20 comprises an inlet being an inlet connector 66, a casing 68, and a pole element 70. The casing 68 comprises a first cylindrical portion 72 and a second cylindrical portion 74, the first portion 72 having smaller diameter than the second portion 74 to define a shoulder 76 of the casing 68. The inlet connector 66 is generally tubular and comprises a downstream portion 78 and an upstream portion 80. The downstream portion 78 has a larger diameter than the upstream portion 80 and carries external threads (not shown). The first portion 72 of the casing 68 carries complementary internal threads (not shown) to mate with the external threads of the inlet connector 66.

The upstream portion 80 of the inlet connector 66 comprises a bore defining an inlet passage 82. The downstream portion 78 of the inlet connector 66 includes a bore with larger diameter than the inlet passage 82 to define a filter chamber 84. The filter chamber 84 accommodates a reagent filter 86, comprising a fine woven metallic or plastic mesh shaped into a thimble-shape. A perimeter rim 88 of the reagent filter 86 is attached to a lift stop 90 comprising an annular ring or washer. The lift stop 90 is attached to the downstream end of the inlet connector 66 and is accommodated partly within the downstream portion 78 of the inlet connector 66 and partly within the first portion 72 of the casing 68.

The pole element 70 comprises a generally cylindrical inner pole piece 92, an outwardly-directed flange 94 and a central tubular land or projection 96 situated downstream of the flange 94. The downstream, outermost edge 98 of the flange 94 is bevelled.

The second portion 74 of the casing 68 has substantially uniform wall thickness except for a region at the downstream end of the casing 68, where the wall thickness of the casing 68 is reduced to define an annular internal groove 100 bounded by an internal shoulder 102. The flange 94 of the pole element 70 is accommodated within the groove 100 of the casing 68. The downstream end of the casing 68, adjacent to the groove 100, is bent over the bevelled edge 98 of the flange 94, for example by crimping or pressing during manufacture, so as to hold the flange 94 against the shoulder 102 of the casing 68.

The second portion 74 of the casing 68 houses a solenoid coil 104 wound on to a coil former 106. The coil former 106 is a ring with a generally 'U'-shaped radial cross section. A first arm of the 'U' defines a first face 108 of the coil former 106 and a second arm of the 'U' defines a second face 110 of the coil former 106. The coil 104 is disposed between the first and second faces 108, 110 of the coil former 106. The coil former 106 is disposed around the inner pole piece 92 of the pole element 70, and a supply passage comprising an annular chamber 112 is defined between the coil former 106 and the inner pole piece 92.

The first face 108 of the coil former 106 carries an annular groove 114, in which a first o-ring 116 is provided. The first o-ring 116 is arranged to create a seal between the shoulder 76 of the casing 68 and the first face 108 of the coil former 106. The second face 110 of the coil former 106 also carries an annular groove 118, adjacent to the inside of the coil former 106, in which a second o-ring 120 is provided. The second o-ring 120 is arranged to create a seal between the flange 94 of the pole element 70 and the second face 110 of the coil former 106. The first and second o-rings 116, 120 are made from a heat-resistant rubber and are arranged to elastically deform during assembly of the pump 20.

The coil 104 is in electrical communication with a power supply (not shown) by way of a supply cable 122. The power supply is capable of supplying a variable current to the coil 104 so as to induce a variable magnetic field around the coil 104. The arrangement of components within the pump 20 will first be described for the situation where no current is supplied to the coil 104, so that no magnetic field is present around the coil 104.

The pole element 70 includes an axial bore 124. A plunger 126 is slidably accommodated within the bore 124. A disc-shaped armature 128 is attached by an interference fit to the plunger 126 near to an upstream end 130 of the plunger 126.

The armature 128 is a clearance fit in the first portion 72 of the casing 68. A delivery valve 132 is provided downstream of the plunger 126. The bore 124 of the pole element 70 comprises an enlarged diameter portion downstream of the plunger. The enlarged diameter portion defines a delivery valve chamber 134 and a shoulder or seating surface 136 of the delivery valve 132. A delivery valve element 138, comprising a disc, is provided within the delivery valve chamber 134. An orifice 140 with small diameter is provided through the thickness of the delivery valve element 138.

The pump connector 26 is defined by an end region 142 of the tube 40 of the connecting pipe 22 with greater wall thickness than that of the tube 40 distant from the pump connector 26. An end region 142 of the tube 40 has an enlarged outer diameter to meet the jacket 44 of the connecting pipe 22 at the first seal 48. A portion of the end region 142 emergent from the jacket 44 is accommodated within a tubular projection 96 of the pole element 70. The bore of the pump connector 26 has an increased diameter in a portion of the end region 142 adjacent to the delivery valve chamber 134 so as to define a shoulder 144 of the tube 40 and a delivery spring chamber 146.

A delivery valve spring 148, comprising a compression spring, is accommodated within the delivery spring chamber 146. The spring 148 acts upon the shoulder 144 of the tube 40 and the delivery valve element 138 to bias the delivery valve element 138 against the seating surface 136 of the pole element 70 to close the delivery valve 132. The bore 42 of the tube 40 of the connecting pipe 22 is in communication with the delivery valve chamber 134 by way of radial channels 150 formed in the end of the pump connector 26.

The bore 124 of the pole element 70, the delivery valve element 138 and a downstream end 152 of the plunger 126 together define a pumping chamber 154 downstream of the plunger 126. The pumping chamber 154 is in communication with the annular chamber 112 by way of filling ports 156 comprising radial passages provided in the inner pole piece 92 of the pole element 70.

The bore 124 of the pole element 70 is enlarged in a region adjacent to the armature 128 so as to define a shoulder 158 within the bore and a return spring chamber 160. A return spring 162 comprising a compression spring is disposed within the return spring chamber 160. The return spring 162 acts upon the shoulder 158 of the bore 124 and the armature 128 to bias the armature 128 against the lift stop 90 so that the armature 128 acts as a stopper for the plunger.

Figure 3:
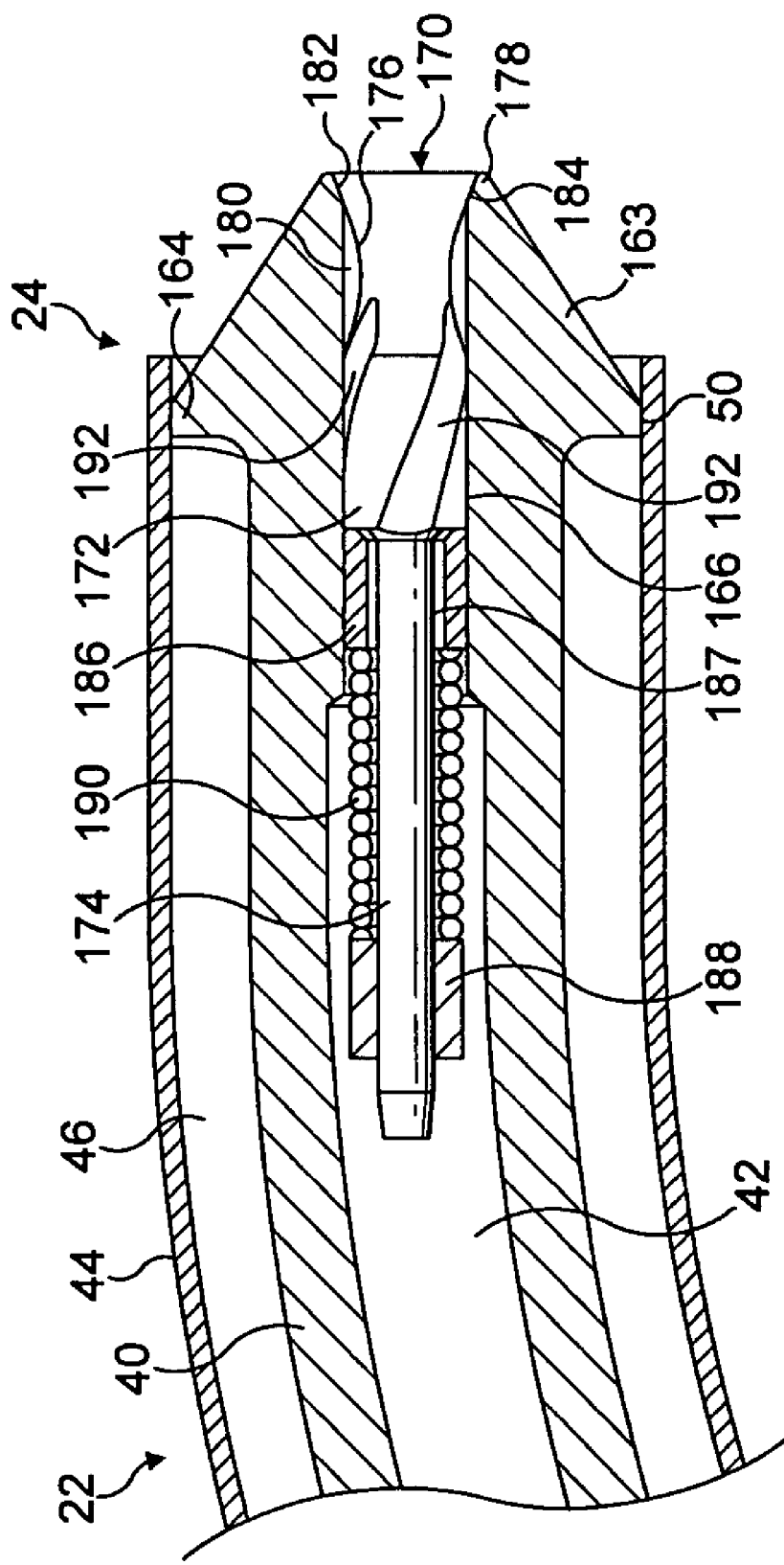
FIG. 3 is a cross-sectional view at larger scale of the dispenser of the dosing device of FIG. 1.

Referring to FIG. 3, the dispenser 24 comprises a nozzle 163 defined by a region of the tube 40 of the connecting pipe 22 shaped into a conical frustum. A rim 164 of the nozzle 163 meets with the jacket 44 of the connecting pipe 22 to form the second seal 50. The nozzle 163 includes a nozzle bore 166 with a smaller diameter than the diameter of the bore 42 of the tube 40 distant from the dispenser 24.

The dispenser 24 further comprises a nozzle valve 168, including a nozzle valve element 170 accommodated within the nozzle bore 166. The nozzle valve element 170 comprises a piston 172 and a shaft 174 upstream of the piston 172. The piston 172 is generally a close clearance fit in the nozzle bore 166, so that the nozzle valve element 170 may slide within the nozzle bore 166. An annular groove 176 is provided in a downstream portion of the piston 172 adjacent to a tip 178 of the nozzle 163 to define a nozzle chamber 180 between the piston 172 and the nozzle bore 166. An end of the piston 172 adjacent to the tip 178 of the nozzle 163 is flared outwards to define a valve surface 182 of the piston 172 having a diameter greater than the nozzle bore 166. The nozzle bore 166 adjacent to the tip 178 of the nozzle 163 is flared to define a sealing surface 184 of the nozzle 163 complementary to the shape of the valve surface 182 of the piston 172.

The end of the piston 172 distant from the tip 178 of the nozzle 163 is attached to the shaft 174 of the nozzle valve element 170. A bush 186 is provided within the nozzle bore 166, and the shaft 174 is a clearance fit within the bush 186 to define a clearance 187. The shaft 174 extends into the tube 40 of the connecting pipe 22. A retaining collar 188 is carried on and fixed to the shaft 174 close to the end of the shaft 174 distant from the piston 172. A nozzle spring 190, comprising a compression spring, is disposed between the retaining collar 188 and the bush 186 so as to bias the valve surface 182 of the piston 172 against the sealing surface 184 of the nozzle 163 to close the nozzle valve 168.

Helical grooves 192 are provided on an upstream portion of the piston 172 to define helical passages between the piston 172 and the nozzle bore 166. The nozzle chamber 180 is therefore in communication with the bore 42 of the tube 40 by way of the helical passages and the clearance 187 between the shaft 174 and the bush 186.

In use, the pump 20 is connected to a reagent supply (not shown) by way of the inlet passage 82 of the inlet connector 66, and the internal spaces or passages within the pump 20, the connecting pipe 22 and the dispenser 24 are filled with reagent. As shown in FIG. 2, reagent can flow from the inlet passage 82 through the reagent filter 86, which serves to filter solid particles such as precipitates out of the reagent flow. The lift stop 90 incorporates radial passages 194 to allow reagent to pass between the lift stop 90 and the armature 128 when the armature 128 is biased against the lift stop 90. Reagent can flow into the pumping chamber 154, by way of a clearance defined between the armature 128 and the casing 68, the annular chamber 112 defined between the inner pole piece 92 and the coil former 106, and the filling ports 156.

In order to dispense reagent, a current is passed through the coil 104 to energise the coil 104 and induce a magnetic field around the coil 104. This causes reagent to be dispensed from the pump 20 into the bore 42 of the connecting pipe 22 and expelled from the dispenser 24 as will now be described with reference to FIGS. 4 and 5.

Figure 4:
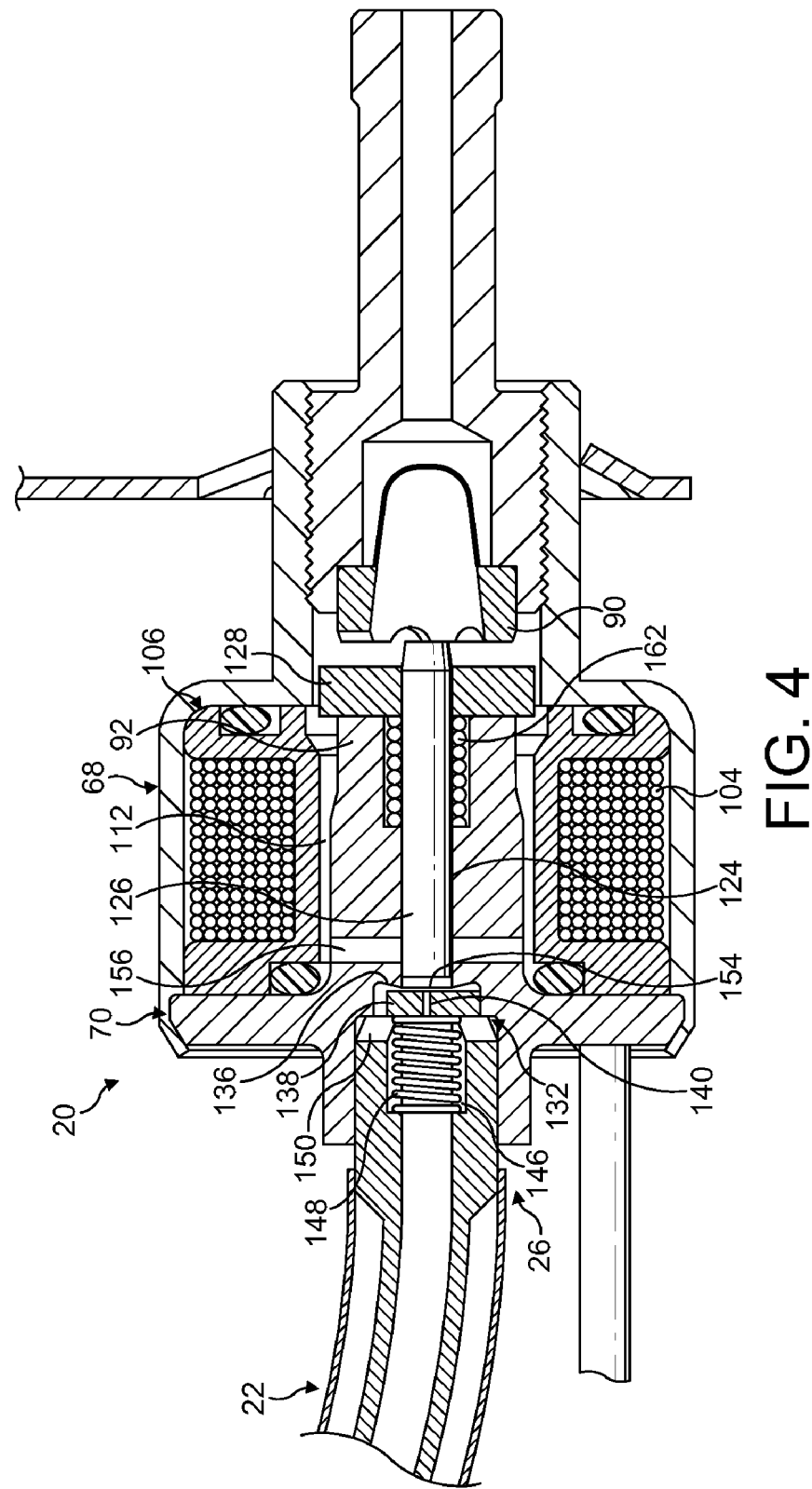
FIG. 4 is a cross-sectional view at larger scale of the pump of the dosing device of FIG. 1, when energised.

As shown in FIG. 4, when a current flows through the coil 104, an electromagnetic circuit arises which encompasses the inner pole piece 92, the armature 128 and the casing 68, which functions as an outer pole piece. The components in the electromagnetic circuit define a electromagnetic structure or actuator arrangement and are arranged so that the armature 128 experiences a magnetic force opposed to the biasing force of the return spring 162. When the magnetic force is strong enough to overcome the biasing force of the return spring 162, the armature 128 moves towards the inner pole piece 92.

Movement of the armature 128 drives a pumping stroke of the plunger 126 by causing the plunger 126 to move in a downstream direction within the bore 124 of the pole element 70. The plunger 126 moves past the filling ports 156 to close the filling ports 156 and substantially prevent further passage of reagent into the pumping chamber 154. The volume of the pumping chamber 154 is reduced due to the movement of the plunger 126, so that the pressure of the reagent in the pumping chamber 154 increases. The reagent imparts a force on the delivery valve element 138 in a direction opposed to the biasing force imparted on the delivery valve element 138 by the delivery valve spring 148.

When the pressure of the reagent in the pumping chamber 154 exceeds a threshold value, the force acting on the delivery valve element 138 due to the reagent becomes sufficient to overcome the biasing force of the delivery valve spring 148 and the delivery valve element 138 moves away from the seating surface 136 of the pole element 70 to open the delivery valve 132. Reagent in the pumping chamber 154 can then flow around the delivery valve element 138 and into the bore 42 of the connecting pipe 22, by way of the radial channels 150 of the pump connector 26. The pressure of reagent in the bore 42 of the connecting pipe 22 therefore increases.

Figure 5:
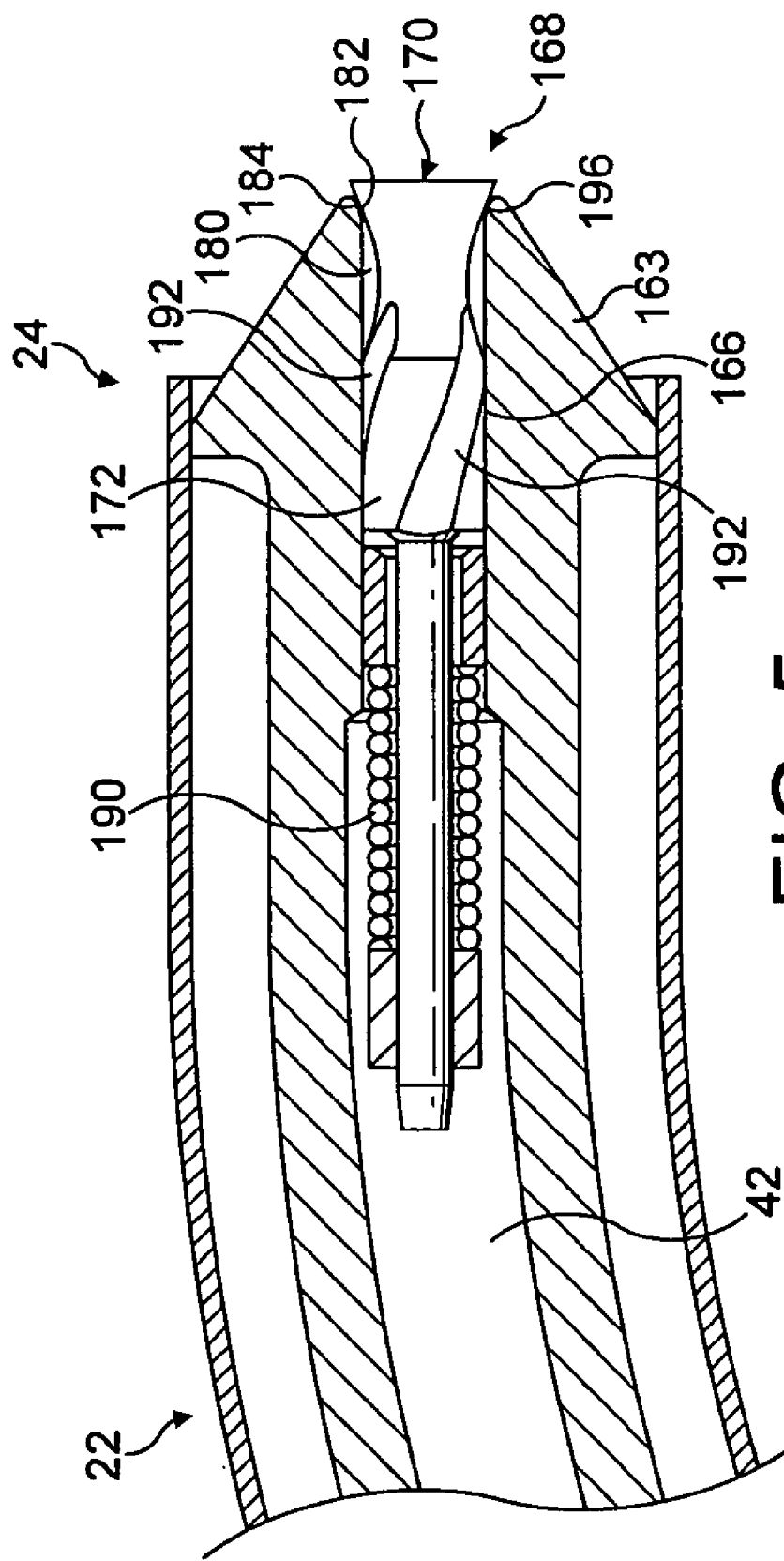
FIG. 5 is a cross-sectional view at larger scale of the dispenser of the dosing device of FIG. 1, when energised.

Referring to FIG. 5, the increase in pressure of the reagent in the bore 42 of the connecting pipe 22 is experienced in the nozzle chamber 180 of the dispenser 24. The pressure of the reagent in the nozzle chamber 180 acts upon the valve surface 182 of the piston 172 so as to impart a force on the nozzle valve element 170 opposed to the biasing force of the nozzle spring 190. When the pressure of reagent exceeds a threshold value, the force acting on the nozzle valve element 172 due to the reagent pressure is sufficient to overcome the biasing force of the nozzle spring 190 and the nozzle valve element 170 moves in a downstream direction and into an open position to create a clearance 196 between the valve surface 182 of the piston 172 and the seating surface 184 of the nozzle 163, so that the nozzle valve 168 becomes open for dispensing of reagent into the exhaust gas flow.

When the nozzle valve 168 is open, reagent is expelled from the dispenser 24 by way of the clearance 196. The size of the clearance 196 and the shape of the seating surface 184 and valve surface 182 can be adapted so that, upon expulsion of the reagent, the reagent is atomised into a fine spray to aid dispersion and mixing of the reagent within the exhaust gases in the exhaust pipe 28.

As will now be described, when the plunger 126 of the pump 20 reaches the end of its pumping stroke, pressure changes take place within the dosing device so that the expulsion of reagent through the dispenser 24 stops. The plunger 126 reaches the end of its pumping stroke when the armature 128 meets the inner pole element 92. Because the delivery valve element 138 is unseated from the seating surface 136 of the pole element 70, the pressure in the pumping chamber 154 decays as reagent flows out of the pumping chamber 154. The force acting on the delivery valve element 138 due to the reagent in the pumping chamber 154 therefore decays. When the force applied by the reagent falls below the opposing force applied to the delivery valve element 138 by the delivery valve spring 148, the delivery valve element 138 closes against the seating surface 136 of the pole element 70 to close the delivery valve 132.

The pressure of the reagent in the bore 42 of the connecting pipe 22 also decays as the reagent flows through the dispenser 24 and into the exhaust pipe 28. Hence, the pressure of the reagent in the nozzle chamber 180 also decays, and the force acting on the valve surface 182 of the piston 172 to maintain the clearance 196 diminishes. Once the force acting on the valve surface 182 of the piston 172 due to the reagent falls below the restoring force acting on the nozzle valve element 170 due to the nozzle spring 190, the nozzle valve element 170 closes to seat the valve surface 182 of the piston 172 against the seating surface 182 of the nozzle 163 to close the nozzle valve 168. Reagent discharge from the dispenser 24 therefore ceases.

Upon opening of the nozzle valve 168, reagent flows through the helical passages defined by the helical grooves 192 of the piston 172. The helical passages cause the reagent to leave the dispenser 24 with a swirling motion, which enhances atomisation of the reagent. In addition, the reagent imparts a torque on the piston 172 as the reagent flows through the helical passages, so that the piston 172 rotates within the dispenser 24. When the nozzle valve 168 closes, therefore, the valve surface 182 is presented to the seating surface 184 of the nozzle 163 at a different angular orientation. Such an arrangement prevents uneven wear of the valve surface 182 and the seating surface 184 which could lead to unwanted leakage of reagent from the dispenser 24 when the nozzle valve 168 is closed. In addition, rotation of the piston 172 encourages the removal of solid deposits from the dispenser 24, for example by dislodging solid particles from the nozzle bore 166, so as to minimise the possibility of the dispenser 24 becoming blocked by solid deposits.

When the current flow through the coil 104 is switched off, the magnetic field around the coil 104 diminishes. The magnetic force acting on the plunger 126, by way of the armature 128, diminishes and can no longer overcome the biasing force of the return spring 162. The action of the return spring 162 on the armature 128 drives a return stroke of the plunger 126, in which the plunger 126 returns to its initial position in which the armature 128 rests against the lift stop 90. The volume of the pumping chamber 154 increases and communication between the filling ports 156 and the pumping chamber 154 is restored. Reagent can flow through the filling ports 156 into the pumping chamber 154, to replenish the reagent in the pumping chamber 154 in preparation for the next pumping stroke.

The orifice 140 in the delivery valve element 138 provides a communication through the delivery valve 132 between the pumping chamber 154 and the delivery spring chamber 146.

The orifice 140 is open to allow reagent to flow through the delivery valve element 138 even when the delivery valve element 138 is seated on the seating surface 136 of the pole element 70. When the delivery valve element 138 has just closed on the seating surface 136, reagent may flow into the pumping chamber 154 from the bore 42 of the connecting pipe 22 so that the pressure of reagent in the bore 42 of the connecting pipe 22 decays rapidly. This causes the nozzle valve 168 to close more rapidly than would be the case if the orifice 140 were not present. Furthermore, when delivery of reagent is not required, for example when the engine is off, any residual pressure that may be present in the bore 42 of the connecting pipe 22 decays by flow of reagent through the orifice 140. This ensures that reagent does not undesirably seep through the dispenser 24 and into the exhaust pipe 28.

The reagent in the dispenser 24 or in the bore 42 of the connecting pipe 22 may boil due to an increase in temperature at the dispenser 24, for example when the engine is switched off and the flow of reagent through the dispenser 24, which tends to cool the dispenser 24, ceases. The residual heat in the exhaust system tends to cause the temperature of the dispenser 24 and the connecting pipe 22 to rise. Should boiling occur, the orifice 140 allows reagent to flow back into the pump 20 from the bore 42 of the connecting pipe 22 to avoid a build up of pressure within the dispenser 24 or the connecting pipe 22.

In operation, the components within the pump 20 have a tendency to heat up due to resistive heating of the coil 104 and magnetic heating due to eddy currents within the armature 128, the casing 68 and the pole element 70. The reagent flowing through the annular chamber 112 between the inner pole piece 92 and the coil former 106 acts to cool the coil 104 and the other components within the pump 20, because heat is transferred into the reagent and transported out of the pump 20. The surface area of the annular chamber 112 exposed to the inner pole piece 92 and the coil former 106 is as large as conveniently possible so as to maximise the heat transfer from the components of the pump 20 to the reagent.

The heat transferred to the reagent from the components of the pump 20 can additionally serve to prevent the reagent from freezing in cold environmental conditions. To this end, the current applied to the coil 104 may be controlled to ensure that sufficient heat is transferred to the reagent to prevent freezing of the reagent. For example, the application of current to the coil 104 may be maintained for a short time after the plunger 126 has reached the end of its pumping stroke, so that heat generation within the pump 20 continues for an extended time and heating of the reagent is prolonged. Under normal conditions, when the ambient temperature is such that the reagent is unlikely to freeze, the current to the coil 104 is switched off at or just prior to the end of the pumping stroke of the plunger 126.

When the pump 20 is not operational, for example when the engine is switched off, the temperature of the residual reagent in the pump 20 will decrease and will eventually reach the ambient temperature. Should the reagent freeze within the pump 20, a direct current can be applied to the coil 104 by way of the power supply to cause resistive heating of the coil 104. Heat from the coil 104 is dissipated into the frozen reagent by conduction through the coil former 106 and through the other components of the pump 20 so that the reagent melts. Alternatively, a large, rapidly pulsing current can be applied to the coil 104 by the power supply. The frequency of the pulses is sufficiently high, and the length of each pulse significantly short, that the resulting magnetic force on the armature 128 is insufficient to cause movement of the plunger 126. However, significant eddy currents are induced in the components within the electromagnetic circuit of the pump 20, and these eddy currents cause the temperature of the components to increase and hence encourage rapid melting of the frozen reagent. In either case, any frozen reagent in the dispenser 24 and the bore 42 of the connecting pipe 22 is melted by heat from the exhaust pipe 28 or by heat originating from the pump 20 and conducted through the connecting pipe 22.

The annular chamber 112 between the inner pole piece 92 and the coil former 106 is small in the radial direction, so that the volume change that would occur should the reagent freeze in the chamber 112 does not give rise to a significant radial stress. In this way, damage to the components of the pump 20, and in particular the coil 104, is avoided.

Movement of the armature 128 is damped by the liquid surrounding the armature 128. For example, when the armature 128 approaches the inner pole piece 92, the liquid must be displaced or squeezed out of the space between the armature 128 and the inner pole piece 92. The resistance of the liquid to displacement acts to decelerate the armature 128 before it comes into contact with the inner pole piece 92, thus minimising mechanical noise and reducing wear on the armature 128 and the inner pole piece 92. Deceleration of the armature 128 also occurs as the armature 128 approaches the lift stop 90 after de-energisation of the coil 104.

The volume of liquid delivered by each pumping stroke of the plunger 126 can be adjusted during manufacture of the pump 20, for example to ensure that the pump 20 dispenses an accurately known volume of reagent with each stroke, and to compensate for manufacturing tolerances. Typically, the volume of liquid delivered by each pumping stroke of the plunger 126 is between 1 and 6 mm$^3$, and in a given pump the volume delivered is adjustable through approximately 1 mm$^3$ However, larger or smaller delivery volumes or adjustment ranges could be provided.

In one method of adjusting the volume of liquid delivered with each pumping stroke, the position of the armature 128 on the plunger 126 is changed to adjust the length of the plunger 126 available to slide within the bore 124 of the inner pole piece 92.

Because the position of the filling ports 156 is fixed with respect to the inner pole piece 92, the effective change in volume of the pumping chamber 154 during a pumping stroke of the plunger 126 is determined by the position of the plunger 126 at the limit of its pumping stroke, when the armature 128 rests against the inner pole piece 92. The change in volume of the pumping chamber 154 is not significantly affected by the position of the plunger 126 at the end of its return stroke. This arises because, when the filling ports 156 are open, liquid may flow away from the pumping chamber 154 to compensate for movement of the plunger 126. Only when the filling ports 156 close to isolate the pumping chamber 154 does the plunger 126 act to significantly increase the pressure in the pumping chamber 154. In this way, moving the plunger 126 in a downstream direction with respect to the armature 128 causes the volume of liquid delivered with each pumping stroke to increase.

Because the armature 128 is an interference fit on the plunger 126, the plunger 126 can be forced to slide through the armature 128 by pressing on the upstream end 130 of the plunger 126. During manufacture, the upstream end 130 of the plunger 126 is accessible when the inlet connector 66, the lift stop 90 and the filter 80 are not fitted to the pump 20. Conveniently, an adjusting fixture (not shown), comprising a body substantially similar to the inlet connector 66 and a pushrod accommodated within a bore of the adjusting fixture, is screwed into the casing 68 of the pump 20 in place of the inlet connector 66. The pushrod is arranged to push against the upstream end 130 of the plunger 126 on application of a force to the pushrod so as to adjust the position of the plunger 126 with respect to the armature 128. The adjusting fixture includes an inlet passage to supply liquid to the pump 20 for testing the pump 20 during adjustment.

The amount of adjustment required is determined by energising the coil 104 of the pump 20 so as to dispense a volume of reagent, measuring the quantity of reagent, and determining the deviation of the dispensed volume from the desired volume. If required, a threaded blind bore (not shown) could be provided in the upstream end 130 of the plunger 126 to mate with a threaded end of the pushrod to allow the plunger 126 to be adjusted in either direction with respect to the armature 128.

Although the position of the plunger 126 at the end of its return stroke does not significantly affect the volume of reagent delivered per pumping stroke, this position does determine what fraction of the pumping stroke occurs before the filling ports 156 close. Since the armature 128 and the plunger 126 accelerate during at least a first part of the pumping stroke, the plunger movement that occurs before the filling ports 156 close influences the acceleration of the plunger 126 at the instant when the filling ports 156 close, and subsequently the rate at which the pressure rises within the pumping chamber 154. The behaviour of the pressure rise in the pumping chamber 154 influences the dosing characteristics of the pump 20, for example the output flow rate.

It is therefore contemplated that the position adopted by the plunger 126 at the end of its return stroke may be determined and adjusted during manufacture of the pump 20 to ensure that the optimum pressure rise occurs within the pumping chamber 154.

In one method of adjusting the position adopted by the plunger 126 at the end of its return stroke, the inlet connector 66 is screwed into or out of the casing 68 so as to adjust the position of the lift stop 90 with respect to the casing 68. The position of the lift stop 90 determines the position of the armature 128, and hence the position of the plunger 126, at the end of the return stroke.

The optimum position for the lift stop 90, and hence the inlet connector 66, is determined by energising the coil 104 of the pump 20 and measuring the pressure of the liquid output from the pump 20 as a function of time. The measured pressure-time characteristic is compared to a reference function comprising a desired pressure-time characteristic, and the position of the inlet connector 66 is adjusted to compensate for any deviation between the measured and desired characteristics.

The electrical inductance of the coil 104 is a sensitive function of the position of the armature 128. In a second method of determining the optimum position of the lift stop 90, a target inductance value is calculated or otherwise determined The target inductance value corresponds to the inductance that occurs when the armature 128 is optimally positioned with respect to the casing 68 when the armature 128 abuts the lift stop 90. The electrical inductance of the coil 104 is measured while the position of the inlet connector 66 is adjusted so that the measured inductance matches the target value.

Once the inlet connector 66 is in a suitable position, it may be fixed in position by, for example, friction between the threads of the inlet connector 66 and the casing 68, or by gluing, soldering or welding the threads of the inlet connector 66 to the threads of the casing 68. Alternatively, or in addition, a locking nut could be used to lock the inlet connector 66 in position.

In use, the dispenser 24 of the dosing device is situated within the flow of exhaust gases upstream of an SCR catalyst, so that the reagent dispensed by the device is carried within the exhaust gas flow to the SCR catalyst, where the reagent undergoes a reaction to chemically reduce $NO_x$ within the exhaust gas flow. The efficiency of the $NO_x$ reduction reaction can be influenced by the rate at which reagent is dispensed from the dosing device, and the manner in which the reagent is dispensed. To control these characteristics, energisation of the coil 104 is regulated as will now be described.

The current applied to the coil 104 is controlled by an engine control unit (not shown) by way of the power supply. The engine control unit stores parameters such as the volume of reagent dispensed per stroke of the plunger 126 and the concentration of the reagent, and monitors signals corresponding to further parameters such as engine speed, ambient temperature, SCR catalyst temperature, reagent temperature, exhaust oxygen content, and so on. The engine control unit determines, based on these parameters, how the current should be applied to the coil 104 to dispense the reagent in such a way that the efficiency of the reduction of $NO_x$ in the exhaust gas is maximised. Typically, the current is supplied to the coil 104 in pulses, the duration, magnitude and profile of each pulse being variable to optimise the output of the pump 20 to suit the operating conditions of the engine at a given time.

The reagent temperature is an important parameter, since the density of the reagent, and hence its volumetric concentration, varies with temperature. For example, when the reagent is warm, the density of the reagent, and hence its volumetric concentration, decreases. If a constant rate of reagent addition is required, the frequency of the current pulses may be increased to compensate for the decrease in concentration.

To determine the reagent temperature, the engine control unit is arranged to measure the resistance of the coil 104 of the pump 20. Because the coil 104 is cooled by the reagent, the temperature of the coil 104 is closely related to the temperature of the reagent. For example, when the reagent is cold, the rate of heat transfer to the reagent from the coil 104 will be high and the coil 104 will be cooled to a greater extent than if the reagent were warm. The resistance of the coil 104 is a function of its temperature, so that the reagent temperature can be calculated from the resistance measurement.

Figure 6:
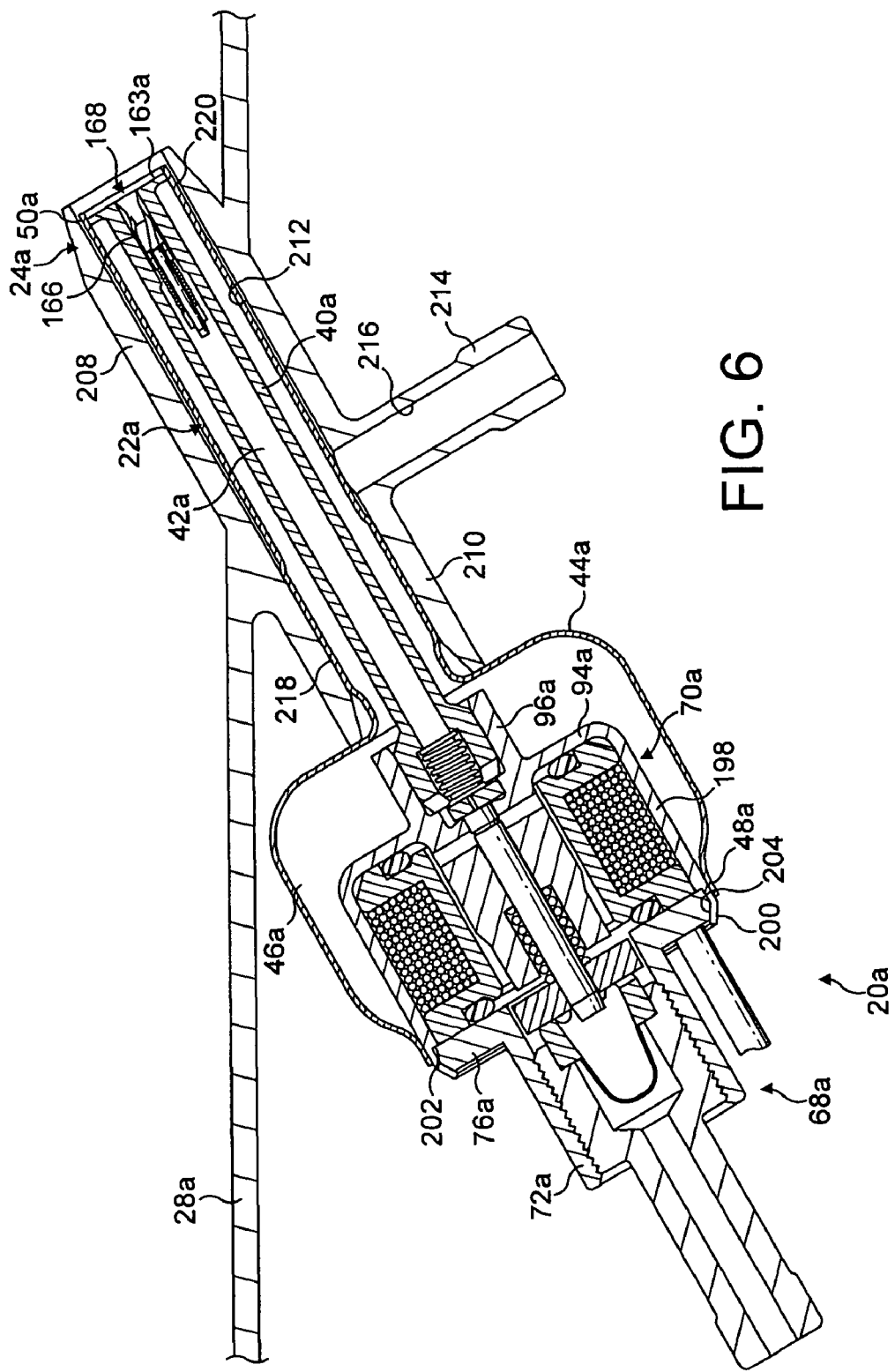
FIG. 6 is a cross-sectional view of a dosing device according to a second embodiment of the present invention, mounted in an exhaust pipe.

A second embodiment of the present invention will now be described with reference to FIG. 6. The second embodiment is similar in form and operation to the first embodiment, and like features share like reference numerals. Only the differences between the second and first embodiments will be described.

The reagent dosing device of the second embodiment comprises a pump 20*a*, a connecting pipe 22*a*, and a dispenser 24*a*. The connecting pipe 22*a* comprises a straight tube 40*a*, so that the dispenser 24*a* is coaxial with the pump 20*a*. A nozzle of the dispenser 24*a* comprises a region of the tube 40*a* shaped into an outwardly-directed nozzle flange 163*a*, and a nozzle bore 166 to house a nozzle valve 168.

A pole element 70*a* comprises an inner pole piece 92*a*, an outer pole piece 198, a tubular projection 96*a* and a flange 94*a*. The outer pole piece 198 comprises an upstream end region 200 having a wall thickness less than the wall thickness distant from the end region 200 to define a shoulder 202. The casing 68*a* comprises an upstream portion 72*a* similar to the upstream portion of the casing of the first embodiment, and an outwardly directed flange 76*a* with a bevelled edge 204. The flange 76*a* of the casing 68*a* abuts the shoulder 202 of the outer pole piece 198. The end region 200 of the outer pole piece 198 is bent over the bevelled edge 204 of the flange 76a, for example by crimping or pressing during manufacture, so as to hold the casing 68a against the shoulder 202 of the outer pole piece 198.

A jacket 44a envelopes the tube 40a of the connecting pipe 22a and partially envelopes the dispenser 24a and the pump 20a. The jacket 44a is fixed to and sealed against the pole element 70a of the pump at a first seal 48a close to the upstream end of the pole element 70a of the pump 20a, and is fixed to and sealed against the dispenser 24a at a second seal 50a at a rim of the nozzle flange 163a.

In use, the device is mounted in a wall of an exhaust pipe 28a having an angled port 206. The port 206 comprises a first portion 208 internal to the exhaust pipe 28a and a second portion 210 external to the exhaust pipe 28a. The first and second portions 208, 210 are tubular and coaxial and are arranged to accommodate the connecting pipe 22a and dispenser 24a of the device within a bore 212 of the port 206. The axis of the port 206 lies at an acute angle to the axis of the exhaust pipe 28a.

An enclosed compartment 46a is therefore defined between the pump 20a, the tube 40a, the nozzle flange 163a and the jacket 44a. The compartment 46a is evacuated so as to minimise the heat transfer from the exhaust pipe 28a and the port 206 to the reagent present in the pump 20a, the bore 42a of the connecting pipe 22a and the dispenser 24a, in use.

The port 206 further comprises an air inlet 214 comprising a tubular passage projecting radially from the second portion 210 of the port 206. A bore 216 of the air inlet 214 is in communication with the bore 212 of the port 206. The jacket 44a is a clearance fit in the port 206, except for an engagement region 218 downstream of the air inlet 214 of the port 206. At the engagement region 218, the diameter of the jacket 44a is enlarged to form a gas-tight interference fit in the port 206. The clearance between the jacket 44a and the port 206 defines an air gap 220.

In use, the air inlet 214 of the port 206 is connected to an air source (not shown), such as an air bleed taken from an inlet passage of the engine downstream of a compressor wheel of a turbocharger. Air therefore enters the air gap 220 and flows within the air gap 220 before discharging into the exhaust gas flow. The flow of air in the air gap 220 serves to cool the connecting pipe 22a and the dispenser 24a so as to minimise the heating of the reagent due to the hot exhaust pipe 28a and exhaust gases.

It will be appreciated that many modifications of the embodiments described above lie within the scope of the present invention. In particular, the components within the pump and their arrangement may differ from those components and arrangements previously described.

Features may be provided to modify or optimise the damping effect of the liquid on the movement of the armature. For example, the inner pole piece and/or the lift stop may have conical or tapered portions to meet with the armature. Similarly, the armature may have a conical or tapered portion to meet with the inner pole piece and/or the lift stop. The armature, the inner pole piece and/or the lift stop may include drillings or slots to modify the flow of liquid around the armature. To further reduce mechanical noise, the lift stop may be made from a polymeric or elastomeric material.

The filter need not be provided within the pump, for example if the liquid entering the pump is pre-filtered in a supply system. As an alternative or in addition to a mesh filter, the filter may incorporate a magnet, for example a magnetic ring or disc, to scavenge magnetic particles from the liquid flow. In particular, solids with a high iron content, which can initiate corrosion of stainless steel components within the pump, will be trapped by the magnet before entering the electromagnetic structure of the pump where they might otherwise be attracted to the magnetised components.

The inlet connector may be an interference or push fit within the casing, in which case neither the inlet connector nor the complementary portion of the casing would carry threads. In this case, adjustment of the position of the inlet connector, to adjust the position of the lift stop and hence the position of the plunger at the end of its return stroke, would be effected by sliding the inlet connector within the casing.

In the described embodiments, the pump connector is formed integrally with the tube of the connecting pipe. It will be appreciated that the pump connector could instead be formed as a separate component. For example, the pump connector could carry threads to engage with threads carried on the tube or the jacket of the connecting pipe. The pump connector could alternatively be formed integrally with the pole element.

As previously described, the density of the reagent, and hence the volumetric concentration of the reagent, is a function of the reagent temperature. The pump may be arranged to automatically compensate for changes in ambient temperature so that, for example, as the temperature increases and the reagent concentration decreases, the volume of liquid dispensed with each pumping stroke increases.

For example, the plunger may be made from a material with a lower coefficient of thermal expansion than the material from which the inner pole piece is made. When the temperature of the pump increases, the inner pole piece and the plunger expand, but the dimensions of the inner pole piece expands relatively more than the dimensions of the plunger. As a result, the volume of the pumping chamber increases to counteract the decrease in concentration of the reagent with temperature. Similarly, the volume of the pumping chamber decreases when the temperature of the pump falls. If the inner pole piece were manufactured from an iron-based alloy, suitable materials for the plunger would include ceramics such as alumina, silicon carbide and silicon nitride. To achieve a large amount of thermal compensation, the length of the plunger should be large relative to the distance moved by the plunger on its pumping and return strokes.

A composite plunger made from two or more materials could be used, arranged so that the coefficient of thermal expansion of at least a part of the plunger in the radial direction is approximately equal to that of the inner pole piece, while the effective coefficient of thermal expansion in the axial direction is significantly lower than that of the inner pole piece. In this way, the thermal compensation function is achieved, but the radial clearance of the plunger in the bore of the pole piece does not change significantly, to avoid excessive leakage of reagent past the plunger.

Many reagents, such as urea solutions, are highly corrosive to commonly-used metallic alloys. The pump may therefore be adapted to have high corrosion resistance. For example, the material in the electromagnetic circuit may be made from a magnetic alloy with a high chromium content and other alloying elements such as molybdenum.

An example of a suitable material is Carpenter Chrome Core® 18-FM, a stainless steel supplied by Carpenter Technology Corporation.

Components of the pump may also be surface treated in order to improve corrosion resistance. Surface treatments may also be employed to improve wear resistance. For example, stainless steel components may be wholly or partly subjected to a case-hardening process in which carbon is introduced into the component by diffusion so as to form chromium carbides close to the surface. A suitable process, known as Kolsterising®, is provided commercially by Bodycote International plc. The chromium carbides increase the surface hardness of the component to improve wear resistance, and also improve the corrosion resistance of the metal. Alternatively, or in addition, surface coatings may be applied to components of the pump. For example, titanium nitride or diamond-like carbon coatings may be employed to improve wear and corrosion resistance. Organic coatings, such as parylene coatings, may be suitable for components which are not subjected to wear, in use.

The invention claimed is:

1. A pump for pumping a liquid, the pump comprising:
an inlet;
an outlet;
a pumping chamber for receiving the liquid from the inlet; and
an actuator arrangement operable between a first position and a second position and arranged to pump the liquid from the pumping chamber into the outlet, the actuator arrangement comprising a solenoid actuator comprising an armature, a solenoid coil, a pole element partly defining an electromagnetic circuit of said actuator arrangement, and a coil former to carry the solenoid coil, wherein the coil former is disposed around the pole element;
wherein the inlet and the pumping chamber are in fluid communication with a supply passage when the actuator arrangement is in the first position, and the supply passage extends into or around the solenoid coil and is defined radially between the coil former and the pole element so as to allow transfer of heat from the actuator arrangement to the liquid.

2. A pump according to claim 1, wherein the actuator arrangement is disposed substantially between the inlet and the outlet.

3. A pump according to claim 1, further comprising a delivery valve operable between a closed position and an open position and arranged to restrict the flow of liquid from the pumping chamber to the outlet when the delivery valve is in the closed position.

4. A pump according to claim 1, wherein a fluid communication path is provided between the pumping chamber and the supply passage by one or more filling ports.

5. A pump according to claim 4, wherein the or each filling port is blocked by the actuator arrangement when the actuator arrangement is in the second position.

6. A pump according to claim 1, wherein the actuator arrangement comprises a plunger arranged to move in response to switching of the actuator arrangement between the first position and the second position.

7. A pump according to claim 6, wherein the plunger is arranged to cause a change in volume of the pumping chamber when the actuator arrangement is switched between the first position and the second position.

8. A pump according to claim 7, wherein the actuator arrangement further comprises a stopper carried on the plunger.

9. A pump according to claim 8, wherein the position of the stopper with respect to the plunger is arranged to be adjustable so as to influence the change in volume of the pumping chamber that occurs when the actuator arrangement is switched between the first position and the second position.

10. A pump according to claim 8, further comprising a lift stop and wherein the stopper is arranged to abut the lift stop when the actuator arrangement is in the first position.

11. A pump according to claim 10, wherein the position of the lift stop with respect to the actuator arrangement is arranged to be adjustable so as to influence the distance through which the plunger moves when the actuator arrangement is switched between the first position and the second position.

12. A pump according to claim 6, wherein the plunger is slidably received in an axial bore of the pole element.

13. A pump according to claim 1, wherein the solenoid coil defines an axis and the supply passage is arranged so that, in use, the direction of flow of liquid in the supply passage is substantially parallel to the axis of the solenoid coil.

14. A pump according to claim 1, wherein the actuator arrangement is arranged so that, in use, the temperature of the actuator arrangement increases upon energization of the actuator arrangement so as to heat the supply passage.

15. A pump according to claim 1, wherein the liquid is a reagent for selective catalytic reduction.

16. A dosing device comprising a pump according to claim 1.

17. An exhaust system comprising a dosing device according to claim 16.

18. A method of cooling a pump for dispensing a liquid in a gas flow, the pump comprising an inlet, an outlet, a pumping chamber and an actuator arrangement; the actuator arrangement moveable between a first position and second position and comprising a solenoid actuator comprising a solenoid coil, a pole element partly defining an electromagnetic circuit of said actuator arrangement, and a coil former to carry the solenoid coil, wherein the coil former is disposed around the pole element; the method comprising:
supplying the liquid to the inlet;
transferring the liquid to the pumping chamber by passing the liquid into or around the solenoid coil along a supply passage defined radially between the coil former and the pole element; wherein the inlet and the pumping chamber are in fluid communication with the supply passage when the actuator arrangement is in the first position; and
pumping the liquid from the pumping chamber to the outlet so as to carry heat away from the actuator arrangement.

19. A method of melting frozen liquid in the pump according to claim 1; the method comprising:
energizing the actuator arrangement so as to cause heating of the actuator arrangement and melting of the frozen liquid.

* * * * *